June 5, 1962 R. E. SEYMOUR 3,037,694

PERFORATED TAPE SENSING AND FEEDING MEANS

Filed May 21, 1958

INVENTOR
RAYMOND E. SEYMOUR

BY John J. Synd[illegible]
ATTORNEY

United States Patent Office 3,037,694

Patented June 5, 1962

3,037,694

PERFORATED TAPE SENSING AND FEEDING MEANS

Raymond E. Seymour, Norwalk, Conn., assignor to Sperry Rand Corporation, New York, N.Y., a corporation of Delaware Filed May 21, 1958, Ser. No. 736,792
13 Claims. (Cl. 235—61.11)

This invention relates to tape sensing means and in particular to means for reading data code holes in a tape, at high speed.

Among the objects of the invention are: to provide means for mounting a sensing device in such a manner that it can be vibrated at high speed to contact a tape and automatically transmit a reading movement, to control a recording circuit, when a perforation is detected at said point of contact; to provide a compact mechanism unit for each row of holes in the tape that will allow a number of the units to be stacked alongside each other in a minimum amount of space; to provide a novel toggle action that in operation will not be effected by the rapid action of the sensing means, will have a minimum operating motion, a minimum amount of friction and extermely small inertias providing for high operating speeds and low noise levels; to provide for the removal and replacement of all the parts; and to eliminate the necessity for individual adjustment of switch springs used.

Other objects and structural details of the invention will be apparent from the following description when read in connection with the accompanying drawing wherein.

Figures 1, 2, 3, 4, 5:
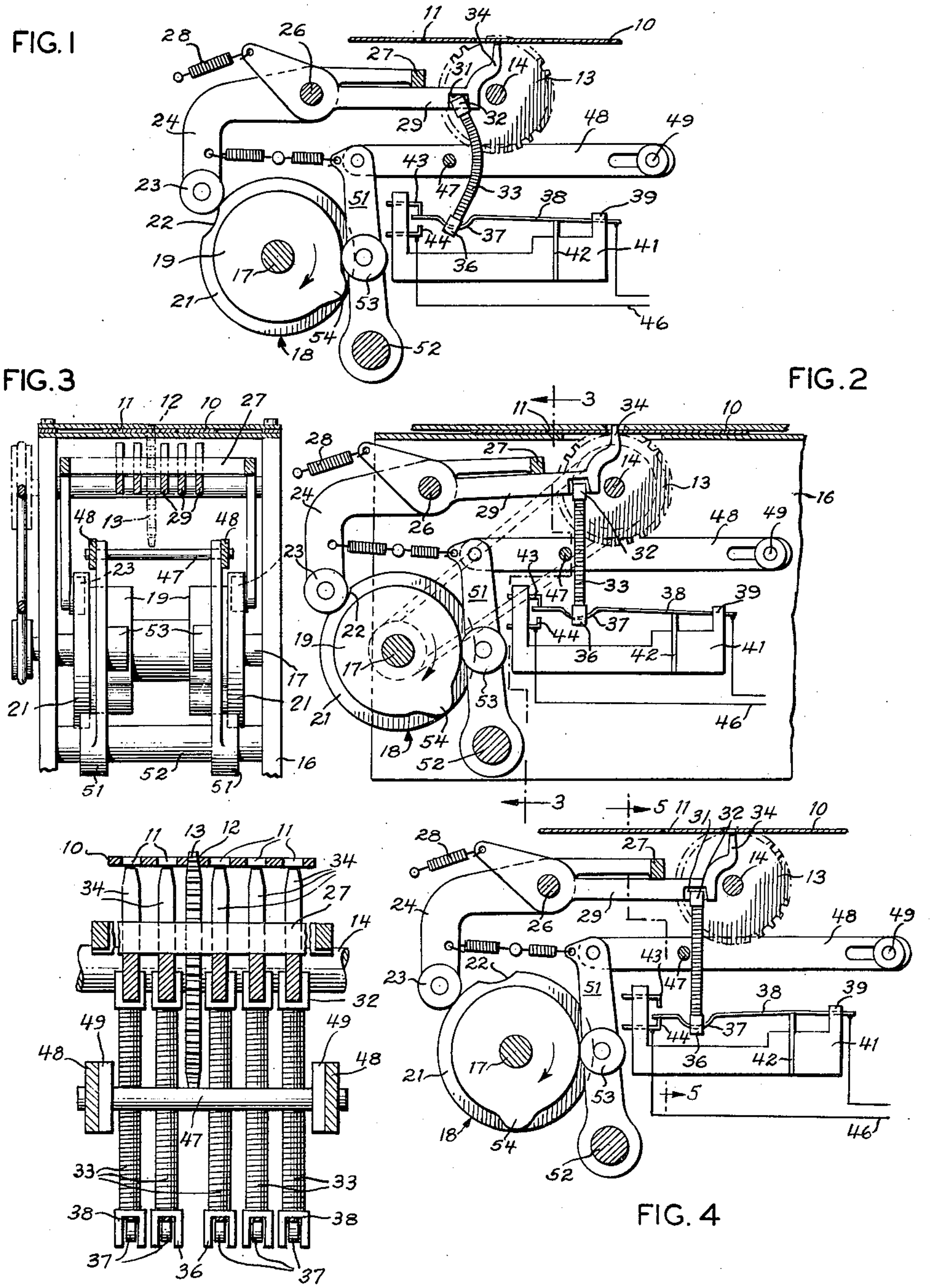
FIGURE 1 is a side view of a tape sensing device showing the mechanism thereof in position at the start of a sensing cycle.
FIGURE 2 is a view similar to FIGURE 1 showing the tape sensing operation.
FIGURE 3 is a section taken on the line 3—3 of FIGURE 2 showing the mounting of the operating parts.
FIGURE 4 is a view similar to FIGURE 1 but showing the retract movement of a reading element that has sensed a hole.
FIGURE 5 is an enlarged vertical section taken on the line 5—5 of FIGURE 4 showing the relative positions of the sensing elements with respect to the tape feeding means.

Referring to the drawings in detail, 10 indicates a data tape of well known form having coded perforations 11 disposed in single character representation laterally of the tape and in flanking relation to a row of sprocket openings 12 for tape feeding engagement by a sprocket wheel 13. The latter is mounted for operation with a tape feed shaft 14 extending between the sides of a suitable frame or receptacle 16 in which the reading unit is housed, the shaft being driven from any suitable power source in synchronism with a cam shaft 17, similarly mounted, for control of the sensing mechanism.

The cam shaft 17 has secured thereto a single cam member 18 shaped to provide, at opposite sides of the center thereof, conjugate toggle cams 19 and sensing cams 21. Each of the latter has a peripheral depression 22 into which a roller 23 rides to rock spring biased bail arms 24, pivoted on a shaft or rod 26, to lift a bail 27 so that springs 28 will swing sensing arms 29 about said rod 26 in tape sensing movement. The outer or free end of each arm 29, of which five are here shown for the simultaneous sensing of five code hole or data designation positions on the tape 10, is undercut in its opposite side faces to provide a seat 31 for a yoke or clevis 32 which anchors the upper end of a spring toggle 33 for free swinging and self-seating movement with respect to the arm 29.

The outer end of each arm 29 is tapered to provide a sensing finger 34 which is disposed vertically and when moved upwardly, by the combined action of the spring 28 and the toggle spring 33 will touch the underside of the tape as in FIGURE 1 and sense any perforation at that location, as illustrated in FIGURE 2. Each toggle 33 is a closely wound helical coil spring and at its lower end has a yoke or clevis piece 36 which rests in a seat or depression 37 formed near the free end of a companion reed spring switch 38. The latter is secured as at 39 in a frame carried contact block 41 of insulating material and passes over a fulcrum strip 42 which holds said free end of the switch strip 38, under flexed tension against the upper one of two spaced contacts 43, 44, the latter one of which is in a circuit 46 including said yieldable spring switch 38.

The seat 37 of the strip 38 is in vertical alignment with the seat 31 of the sensing arm 29 and at the beginning of a cycle of operation, as seen in FIGURE 1, the spring toggle 33 has been moved from vertical to "broken" position by the operation of a bail rod 47 which is common to all of the toggles and is carried at its opposite ends in slide bars 48 which are movably connected to the frame by pin and slot connections 49. The opposite ends of the bars are pivoted to the upper ends of spring biased rock arms 51 which are mounted on a rock shaft 52 supported in the frame and arranged to carry cam rollers 53 in contact with the toggle cam 19.

As the high point 54 of the cam rides from beneath the cam roller 53 and the spring toggle has snapped from rectilinear to bowed position, the cam roller 23 seating in depression 22 of cam 21 (FIG. 2) will raise the bail 27 and the pressure of the springs 28 will swing the sensing arms 29 counterclockwise in tape sensing action. If no perforation is detected by the rising movement of a sensing finger 34 the tape will arrest the movement of the finger and the spring toggle will remain in bowed position when the bail 27 has a restoring movement as the cam roller 23 rides out of the depression 22. The bowed condition of any spring toggle 33 will cause it to yield against the downward movement of its associated sensing arm 29 and the switch 38 will not close a circuit.

If any rising finger 34 detects or reads a perforation, as shown in FIGURE 2, the movement of the sensing finger into a perforation is sufficient for the spring toggle to move from its bowed position and assume a vertical or straight position, with the result that, when the retract operation of the bail 27 occurs, as shown in FIGURE 4, the downward movement of any sensing arm, that has detected a perforation, will push the toggle down and close its associated switch 38.

Each switch completes a circuit for translating and recording the coded character read, through the use of any of the well known decoding and printing or punching devices employed for this purpose, and which it is not deemed necessary to show as they form no part of the present invention.

While there has been shown and described the fundamentally novel features of the invention, it will be understood that various omissions and changes in the forms and details of the device illustrated and in its operation may be made by those skilled in the art without departing from the spirit of the invention and it is the intention therefore to be limited only as indicated by the scope of the following claims.

What I claim is:

1. A device for reading data code perforations in a moving tape or the like, comprising perforation sensing means movable in sensing and retract direction, switch means for controlling a circuit, toggle means including a spring extending between the sensing means and the switch means, said spring normally assuming a bowed position, and assuming a rectilinear position only when a hole is sensed, and said spring means being operable to close a circuit upon retractive movement of the toggle means in a rectilinear position.

2. In a device for reading data perforations in a moving tape or the like, perforation sensing means movable in sensing and retract directions, switch means for controlling a circuit, toggle means including a spring extending between said sensing means and the switch means and movable from a normal bowed position to a rectilinear position when the sensing means moves in a sensing direction and a hole is sensed, and operating said switch means when in the rectilinear position during the retractive movement of the sensing means.

3. In a device for reading data perforations in a moving tape or the like, perforation sensing means movable in sensing and retract directions, switch means for controlling a circuit, and toggle means extending between said sensing means and the switch means and movable from a bowed to a rectilinear position during the movement of the sensing means in a sensing direction when a hole is sensed, and operating said switch means when in a rectilinear position during the retractive movement of said sensing means.

4. A device of the character set forth in claim 3 in which said perforation sensing means comprises a plurality of pivoted sensing arms each shaped to provide a finger portion at one end thereof, spring means for urging said sensing arms in tape sensing direction, and cyclically operating means for holding said arms against movement by said spring means.

5. A device of the character set forth in claim 3 in which said sensing means comprises a plurality of pivoted sensing arms each shaped to provide a sensing finger portion, spring means for urging said sensing arms in tape sensing direction and bail means overlying said arms for cyclically restraining the latter from having sensing movement.

6. A device of the character set forth in claim 3 in which said sensing means comprises a plurality of pivoted sensing arms each shaped to provide a sensing finger portion, spring means for urging said sensing arms in tape sensing direction, and bail means overlying said arms for cyclically moving the latter in retract direction.

7. A device of the character set forth in claim 3 in which said toggle means comprises a helically wound spring and means for cyclically moving said spring from a rectilinear position to a bowed position.

8. A device of the character set forth in claim 3 in which said toggle means comprises a helically wound spring connecting each sensing means and associated switch, bar means including a bail common to all of said springs, means for reciprocating said bar means cyclically, and said bail means being adapted to move said springs from rectilinear to bowed position.

9. In a device for reading data perforations in a moving tape or the like, perforation sensing means including sensing arms biased for sensing movement, sensing bail means biased for movement with said arms, a sensing cam for momentarily releasing the bail to provide a sensing movement of said arms and for restoring the bail to retract the arms after sensing movement, circuit controlling switches, a helical spring extending between each of the switches and the arms and constituting toggle means, slide means including a toggle cam for moving the toggle bail to snap said toggle springs to bowed position before the sensing arms are released by said sensing bail means, and said toggle springs assuming a straight position, when an associated sensing arm enters a perforation, to close the related switch when the associated sensing arm is retracted.

10. In a device for reading data perforations in a moving tape or the like, perforation sensing means including a sensing arm biased for sensing movement, sensing bail means biased for movement with said arm, a sensing cam for momentarily releasing the bail means to provide a sensing movement of said sensing arm and for restoring the bail to retract the sensing arm after a sensing movement, a circuit controlling switch, a closely wound coil spring connecting the switch and the sensing arm and constituting toggle means, a toggle bail, a toggle cam for synchronous operation with said sensing cam for moving the toggle bail to snap said toggle to bowed position before release of said sensing bail means by said bail cam, and said toggle moving to a straight position when the sensing arm enters a perforation and being adapted to operate said switch when the sensing arm is retracted.

11. In a device of the character set forth in claim 10 in which said circuit controlling switch includes a spring strip having a free end for movement between contact members and fulcrum means for yieldably urging the free end of the strip against one of said contact members.

12. In a device for reading data perforations in a tape or the like, tape feeding means, perforation sensing means including sensing arms arranged in flanking relation to said tape feeding means and each arm being biased for sensing movement, sensing bail means common to said arms and biased for movement with said arms, a sensing cam for momentarily releasing the bail means to provide a sensing movement of the sensing arms and for restoring the bail to retract the sensing arms after a sensing movement, a circuit controlling switch for each sensing arm, a closely wound coil spring connecting each switch with a sensing arm and constituting toggle means, a toggle bail common to each spring, a toggle cam for synchronous operation with the tape feeding means and the sensing cam for moving the toggle bail to snap the toggle means to bowed position before release of said sensing bail means by the bail cam, and said toggle moving to straight position when the related sensing arms enter a perforation and being adapted to operate the related switches when the sensing arms are retracted.

13. In a device for reading data perforations in a moving tape or the like, perforation sensing means comprising: arm sensing means operable for feeling predetermined position areas on the tape's surface and for being retracted therefrom; toggle means responsive to retraction of the arm sensing means to assume either a first or a second attitude, the first attitude being assumed in response to a perforation detected by the sensing arm means and the second attitude being assumed in response to the tape's surface being detected by the sensing arm means; and, cam means for controlling the feeling and retraction of the sensing arm means and for setting the toggle means in the second attitude prior to the feeling of the position areas on the tape's surface by the sensing arm means.

References Cited in the file of this patent

UNITED STATES PATENTS

| | | |
|---|---|---|
| 2,577,070 | Cheney | Dec. 4, 1951 |
| 2,614,632 | Clos | Oct. 21, 1952 |